United States Patent
Shimizu et al.

(10) Patent No.: US 9,199,644 B2
(45) Date of Patent: Dec. 1, 2015

(54) SPEED RATIO CONTROL DEVICE AND METHOD FOR WORKING VEHICLE

(75) Inventors: Takeo Shimizu, Tokyo (JP); Naotoshi Mori, Tokyo (JP)

(73) Assignee: KAYABA INDUSTRY CO., LTD., Tokyo (JP)

( * ) Notice: Subject to any disclaimer, the term of this patent is extended or adjusted under 35 U.S.C. 154(b) by 1619 days.

(21) Appl. No.: 12/530,589

(22) PCT Filed: Mar. 7, 2008

(86) PCT No.: PCT/JP2008/054677
§ 371 (c)(1),
(2), (4) Date: Sep. 9, 2009

(87) PCT Pub. No.: WO2008/111655
PCT Pub. Date: Sep. 18, 2008

(65) Prior Publication Data
US 2010/0042301 A1 Feb. 18, 2010

(30) Foreign Application Priority Data
Mar. 9, 2007 (JP) ................................. 2007-059704

(51) Int. Cl.
| B60W 10/06 | (2006.01) |
| B60W 30/18 | (2012.01) |
| F02D 29/02 | (2006.01) |
| F16H 61/47 | (2010.01) |
(Continued)

(52) U.S. Cl.
CPC ......... *B60W 30/18063* (2013.01); *F02D 29/02* (2013.01); *F16H 61/47* (2013.01); *B60W 2510/0638* (2013.01); *B60W 2540/10* (2013.01); *F02D 29/04* (2013.01); *F02D 31/001* (2013.01); *F16H 59/18* (2013.01); *F16H 59/44* (2013.01)

(58) Field of Classification Search
CPC combination set(s) only.
See application file for complete search history.

(56) References Cited

U.S. PATENT DOCUMENTS 4,507,986 A * 4/1985 Okamura et al. ............... 477/43
4,658,360 A * 4/1987 Osanai et al. ................... 701/62
(Continued)

FOREIGN PATENT DOCUMENTS

| CN | 1342575 A | 4/2002 |
| JP | 05-052226 A | 3/1993 |
(Continued)

OTHER PUBLICATIONS

Foreign Office Action issued on Feb. 4, 2013.
(Continued)

*Primary Examiner* — Jonathan L Sample
(74) *Attorney, Agent, or Firm* — Rabin & Berdo, P.C.

(57) ABSTRACT

A working vehicle that uses the output of an internal combustion engine (30) as a working power and a traveling power includes an accelerator pedal (1) that increases a rotation speed of the engine (30) when depressed and a transmission (40) that shifts a rotation of the engine (30) and applies the shifted rotation to the traveling power. A speed ratio control device of the transmission (40) calculates a first target vehicle speed (Wne) according to the rotation speed of the engine (30), calculates a second target vehicle speed (Wu) according to a depression amount of the accelerator pedal (1), and controls the speed ratio of the transmission (40) on the basis of the smaller of these target vehicle speeds. As a result, a vehicle speed according to the depression amount of the traveling accelerator pedal (1) is obtained even when the internal combustion engine (30) rotates at high speed.

9 Claims, 3 Drawing Sheets

(51) Int. Cl.
*F02D 29/04* (2006.01)
*F02D 31/00* (2006.01)
*F16H 59/18* (2006.01)
*F16H 59/44* (2006.01)

(56) References Cited

U.S. PATENT DOCUMENTS

| | | | |
|---|---|---|---|
| 4,750,598 A * | 6/1988 | Danno et al. | 477/110 |
| 5,592,817 A * | 1/1997 | Nishimura et al. | 60/431 |
| 5,665,021 A * | 9/1997 | Inoue | 476/4 |
| 5,995,895 A * | 11/1999 | Watt et al. | 701/50 |
| 6,052,644 A * | 4/2000 | Murakami et al. | 701/93 |
| 6,055,474 A * | 4/2000 | Adachi et al. | 701/51 |
| 6,066,070 A * | 5/2000 | Ito et al. | 477/43 |
| 6,090,007 A * | 7/2000 | Nakajima et al. | 477/46 |
| 6,148,257 A * | 11/2000 | Katakura et al. | 701/54 |
| 6,205,387 B1 * | 3/2001 | Ochiai | 701/51 |
| 6,398,691 B1 * | 6/2002 | Takizawa et al. | 477/37 |
| 6,505,139 B1 * | 1/2003 | Koga et al. | 702/148 |
| 6,724,300 B2 * | 4/2004 | Miyakoshi et al. | 340/435 |
| 7,037,235 B2 * | 5/2006 | Jozaki et al. | 477/44 |
| 7,285,072 B2 * | 10/2007 | Williams | 477/108 |
| 7,434,641 B2 * | 10/2008 | Takami et al. | 180/65.25 |
| 7,472,008 B2 * | 12/2008 | Betz et al. | 701/50 |
| 7,771,314 B2 * | 8/2010 | Eguchi et al. | 477/110 |
| 8,532,884 B2 * | 9/2013 | Saito et al. | 701/50 |
| 2002/0014363 A1 * | 2/2002 | Kubota et al. | 180/197 |
| 2002/0019295 A1 * | 2/2002 | Kobayashi et al. | 477/174 |
| 2002/0028729 A1 * | 3/2002 | Kobayashi et al. | 477/174 |
| 2002/0033298 A1 * | 3/2002 | Ono et al. | 180/373 |
| 2002/0037786 A1 * | 3/2002 | Hirano et al. | 475/208 |
| 2002/0115529 A1 * | 8/2002 | Narita et al. | 477/40 |
| 2003/0233187 A1 * | 12/2003 | Egami | 701/96 |
| 2004/0209718 A1 * | 10/2004 | Ishibashi et al. | 474/18 |
| 2004/0209719 A1 * | 10/2004 | Ochiai et al. | 474/18 |
| 2004/0215385 A1 * | 10/2004 | Aizawa et al. | 701/93 |
| 2004/0254039 A1 * | 12/2004 | Yasui et al. | 475/5 |
| 2005/0027423 A1 * | 2/2005 | Minami et al. | 701/51 |
| 2005/0103544 A1 * | 5/2005 | Takami et al. | 180/65.2 |
| 2005/0282682 A1 * | 12/2005 | Ishii et al. | 477/107 |
| 2006/0014608 A1 * | 1/2006 | Mitchell et al. | 477/107 |
| 2006/0020383 A1 * | 1/2006 | Betz et al. | 701/50 |
| 2006/0161330 A1 * | 7/2006 | Lupo | 701/93 |
| 2006/0201147 A1 * | 9/2006 | Nakamura et al. | 60/445 |
| 2006/0230920 A1 * | 10/2006 | Berg et al. | 91/499 |
| 2006/0252597 A1 * | 11/2006 | Williams | 477/107 |
| 2006/0293825 A1 * | 12/2006 | Sporl et al. | 701/93 |
| 2007/0056783 A1 * | 3/2007 | Joe et al. | 180/65.2 |
| 2007/0137338 A1 * | 6/2007 | Nishi et al. | 74/335 |
| 2007/0208485 A1 * | 9/2007 | Yamamura et al. | 701/93 |
| 2008/0154472 A1 * | 6/2008 | Okuda et al. | 701/93 |
| 2008/0315559 A1 * | 12/2008 | Murakami et al. | 280/446.1 |
| 2009/0011887 A1 * | 1/2009 | Komada et al. | 475/5 |
| 2009/0029826 A1 * | 1/2009 | Eguchi et al. | 477/39 |
| 2009/0143192 A1 * | 6/2009 | Fuchs et al. | 477/43 |

FOREIGN PATENT DOCUMENTS

| | | |
|---|---|---|
| JP | 06-081946 A | 3/1994 |
| JP | 7-167233 | 7/1995 |
| JP | 07-215096 A | 8/1995 |
| JP | 2008-296726 | * 11/1996 |
| JP | 2001-027319 A | 1/2001 |
| JP | 2001-113985 A | 4/2001 |
| JP | 2001-253789 A | 9/2001 |
| JP | 2002-340182 A | 11/2002 |
| JP | 2002-372148 A | 12/2002 |
| JP | 2006-219066 A | 8/2006 |

OTHER PUBLICATIONS

Foreign Office Action issued on Oct. 23, 2012.

* cited by examiner

SPEED RATIO CONTROL DEVICE AND METHOD FOR WORKING VEHICLE

TECHNICAL FIELD

This invention relates to speed ratio control in a construction vehicle or an agricultural vehicle in which an output of an internal combustion engine is used as both working power and traveling power.

BACKGROUND ART

A small wheel loader used in construction work such as laying and loading earth is installed with a hydrostatic transmission (to be abbreviated to HST hereafter) as a traveling continuously variable transmission, and performs so-called automotive control, which is speed ratio control in which a vehicle speed is increased in accordance with an increase in an engine rotation speed.

JP 2002-372148A, published by the Japan Patent Office in 2002, discloses a control method for a vehicle installed with an HST and an internal combustion engine having an electronic governor for controlling a throttle opening of the engine in accordance with a command signal, in which a target vehicle speed and a target rotation speed of the internal combustion engine are calculated in accordance with a depression amount of a traveling accelerator pedal, whereupon the throttle opening of the internal combustion engine and a speed ratio of the HST are controlled in conjunction.

SUMMARY OF THE INVENTION

Small tractors used for agricultural work and the like often include a mechanical throttle, in which the throttle of the internal combustion engine operates in conjunction with the accelerator pedal and an accelerator lever via a throttle wire. In this type of mechanical throttle vehicle, an operator opens the throttle via the throttle wire by depressing the traveling accelerator pedal or operating the working accelerator lever, thereby increasing the output of the internal combustion engine.

For example, when a small tractor is used to perform mowing work, an operating method whereby the vehicle is driven at a low speed while running the engine at a high rotation by operating the accelerator lever in order to perform the mowing work may be used. However, with automotive control, it is difficult to obtain a desired vehicle speed in such cases.

Meanwhile, a working vehicle is provided with an inching pedal. The inching pedal is constituted to disengage a clutch and activate a brake relative to depression exceeding a fixed amount. By operating the inching pedal in a similar manner to a clutch operation in a manual shift passenger vehicle, the vehicle speed can be suppressed while maintaining high rotation in the internal combustion engine.

However, this working vehicle operation is dependent on the operating technique of the operator, and a particularly large burden is placed on the operator when vehicle speed adjustment using the inching pedal is performed over a long period of time during extended work.

It is therefore an object of this invention to obtain a low vehicle speed according to a depression amount of a traveling accelerator pedal without the need for vehicle speed adjustment using an inching pedal, even when an internal combustion engine rotates at high speed.

BEST MODES FOR CARRYING OUT THE INVENTION

Figure 1:
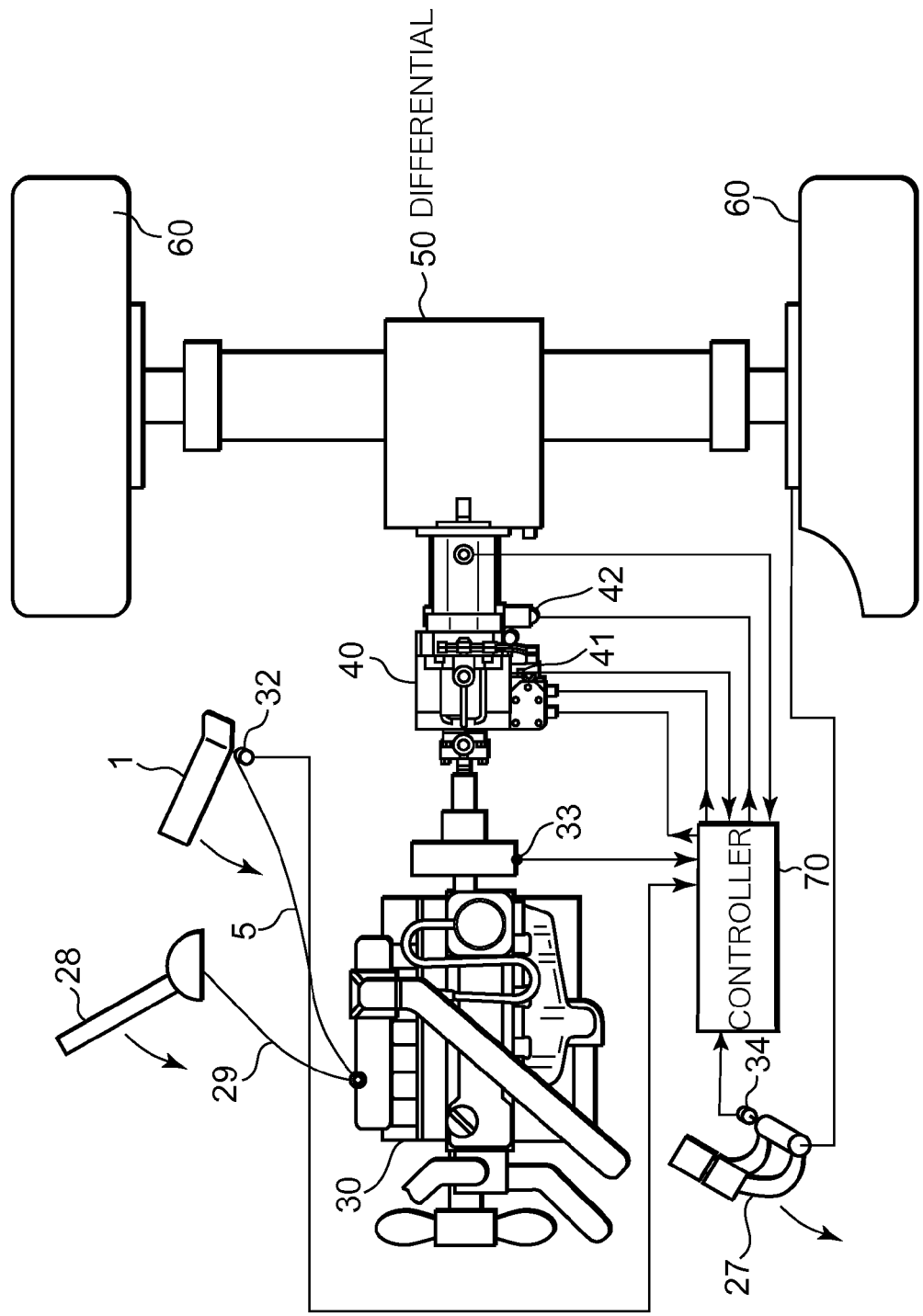
FIG. 1 is a schematic diagram of a tractor driving system to which a speed ratio control device according to this invention is applied.

Referring to FIG. 1 of the drawings, an output of an internal combustion engine 30 of a tractor serving as a working vehicle is input into an HST 40. An output of the HST 40 is transmitted to left and right drive wheels 60 via a differential 50.

The HST 40 is constituted by a combination of a swash plate type variable capacity hydraulic pump and a swash plate type variable capacity hydraulic motor, for example. The HST 40 varies a rotation speed of the hydraulic motor relative to a rotation speed of the hydraulic pump by varying an angle of each swash plate via a servo mechanism, or in other words by varying the respective capacities of the hydraulic pump and hydraulic motor, and thereby shifts a speed ratio continuously from a stationary vehicle state to a maximum forward/reverse speed. Here, the speed ratio is a value obtained by dividing the rotation speed of the hydraulic pump by the rotation speed of the hydraulic motor. In the stationary vehicle state, the speed ratio reaches infinity, and at the maximum speed, the speed ratio takes a minimum value.

A traveling accelerator pedal 1, an accelerator lever 28, and an inching pedal 27 are provided on a driving seat of the tractor as vehicle operating means.

The accelerator pedal 1 is operated by a foot of an operator. To adjust the output of the internal combustion engine 30 in conjunction with the accelerator pedal 1, the tractor comprises a throttle wire 5 for operating a throttle drum, not shown in the figure, in conjunction with the accelerator pedal 1. When the operator depresses the accelerator pedal 1, the throttle wire 5 opens a throttle via the throttle drum, thereby increasing the output of the internal combustion engine 30.

The inching pedal 27 is also operated by a foot of the operator. When the inching pedal 27 is depressed, the angles of the respective swash plates of the variable capacity hydraulic pump and variable capacity hydraulic motor of the HST 40 are varied such that the speed ratio of the HST 40 reaches infinity. As a result, torque transmission from the hydraulic pump to the hydraulic motor is blocked, and the tractor decelerates while coasting.

Further, when the inching pedal 27 is depressed beyond a fixed level, a brake device performs braking on the vehicle in conjunction with the inching pedal 27 while the speed ratio of the HST 40 is maintained at infinity. In this case, braking is performed actively on the vehicle.

The inching pedal 27 is used during a loader operation in which earth is scooped up by driving a bucket while running the tractor at an extremely low speed, for example. In this case, the operator depresses the inching pedal 27 and the accelerator pedal 1 simultaneously so that the rotation speed of the engine 30 can be increased while reducing the vehicle speed. In other words, an operating speed of a hydraulic cylinder for operating a working member such as a boom, an arm, or a bucket can be increased while traveling at low speed.

To perform speed ratio control on the HST 40, the tractor includes a controller 70. The tractor also includes an angle sensor 32 employing a potentiometer for detecting a depression angle U of the accelerator pedal 1, a rotation speed sensor 33 for detecting a rotation speed Ne of the internal combustion engine 30, an angle sensor 34 employing a potentiometer for detecting a depression angle i of the inching pedal 27, and potentiometers 41, 42 for detecting the angles of the respective swash plates of the variable capacity hydraulic pump and variable capacity hydraulic motor of the HST 40. Detection signals from the respective sensors are input as signals into the controller 70.

The controller 70 is constituted by a microcomputer comprising a central processing unit (CPU), a read-only memory (ROM), a random access memory (RAM), and an input/output interface (I/O interface). The controller 70 may be constituted by a plurality of microcomputers.

Figure 2:
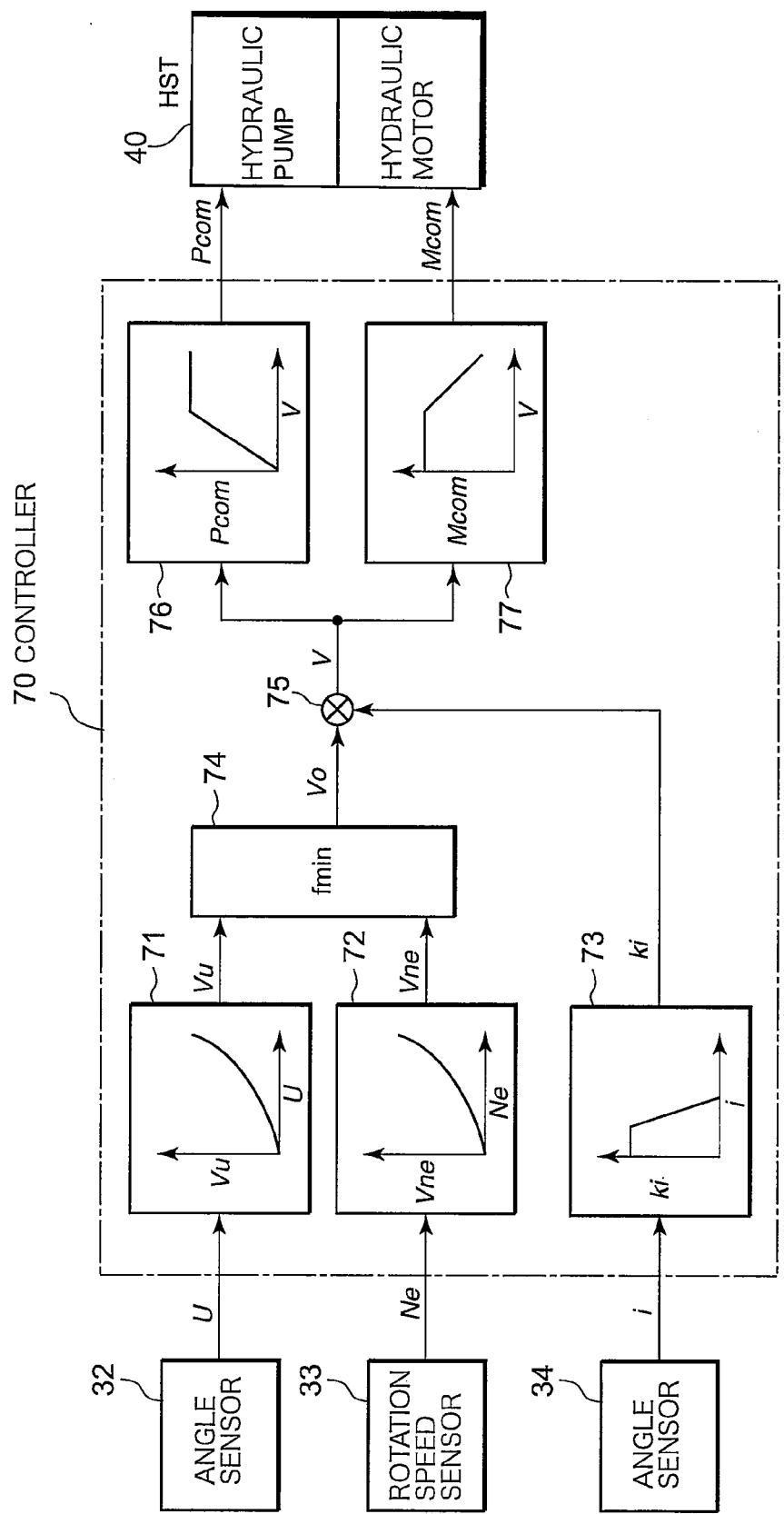
FIG. 2 is a block diagram showing the constitution of the speed ratio control device.

Referring to FIG. 2, speed ratio control executed by the controller 70 on the HST 40 will be described.

A map 71 that sets a target vehicle speed Vu in accordance with the depression angle U of the accelerator pedal 1, a map 72 that sets a target Vne in accordance with the engine rotation speed Ne, a map 73 that sets an inching coefficient ki (≤1) in accordance with the depression angle i of the inching pedal 27, a map 76 that sets a swash plate angle command value Pcom of the variable capacity hydraulic pump in accordance with a final vehicle speed command value V, and a map 77 that sets a swash plate angle command value Mcom of the variable capacity hydraulic motor in accordance with the final vehicle speed command value V are stored in advance in the ROM of the controller 70. The characteristics of these maps are shown in the figure.

The controller 70 further comprises a selection unit 74 that selects the smaller of the target vehicle speed Vu and the target vehicle speed Vne, which are determined from the maps 71 and 72, and sets the selection result as a vehicle speed command basic value Vo, and a calculation unit 75 that calculates the final vehicle speed command value V by multiplying the inching coefficient ki by the vehicle speed command value Vo.

It should be noted that these units are illustrated as virtual units expressing functions of the controller 70, and do not necessarily possess a physical existence.

Using these functions, the controller 70 determines the swash plate angle command value Pcom of the variable capacity hydraulic pump and the swash plate angle command value Mcom of the variable capacity hydraulic motor of the HST 40 on the basis of the depression angle U of the accelerator pedal 1, the rotation speed Ne of the internal combustion engine 30, and the depression angle i of the inching pedal 27, and outputs the determined values to the HST 40.

Figure 3:
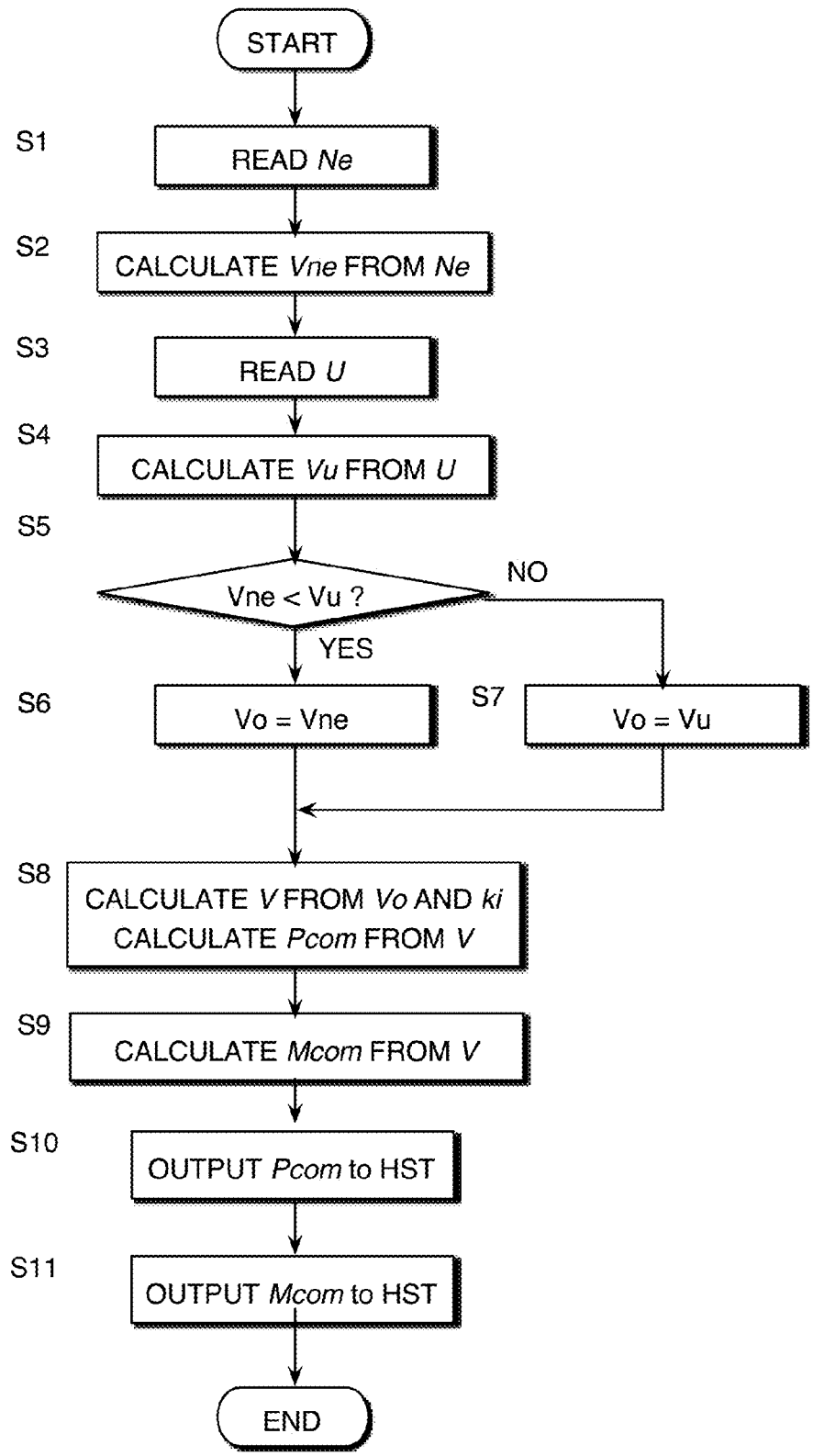
FIG. 3 is a flowchart showing a speed ratio control routine executed by a controller according to this invention.

Next, referring to FIG. 3, a speed ratio control routine executed by the controller 70 to realize the above control will be described. The controller 70 executes this routine at fixed intervals, for example intervals of ten milliseconds.

First, in a step S1, the controller 70 reads the rotation speed Ne of the internal combustion engine 30 input from the rotation speed sensor 33.

Next, in a step S2, the controller 70 calculates the target vehicle speed Vne from the rotation speed Ne of the internal combustion engine 30 by searching the map 72 stored in the ROM. The step S2 corresponds to first target vehicle speed calculating means.

In a step S3, the controller 70 reads the depression angle U of the accelerator pedal 1 input from the angle sensor 32.

In a step S4, the controller 70 calculates the target vehicle speed Vu from the depression angle U of the accelerator pedal 1 by searching the map 71 stored in the ROM. The step S4 corresponds to second target vehicle speed calculating means.

In a step S5, the controller 70 uses the function of the selection unit 74 to determine whether or not the target vehicle speed Vne is smaller than the target vehicle speed Vu. When the determination is affirmative, the controller 70 sets the vehicle speed command basic value Vo to be equal to the target vehicle speed Vne in a step S6. Following the processing of the step S6, the controller 70 performs the processing of a step S8.

When the determination is negative, on the other hand, the controller 70 sets the vehicle speed command basic value Vo to be equal to the target vehicle speed Vu in a step S7. Following the processing of the step S7, the controller 70 performs the processing of the step S8.

In the step S8, the controller 70 determines the inching coefficient ki from the depression angle i of the inching pedal 27 input from the angle sensor 34 by searching the map 73 stored in the ROM. The controller 70 then calculates the final vehicle speed command value V by multiplying the inching coefficient ki by the vehicle speed command basic value Vo. Further, the controller 70 calculates the swash plate angle command value Pcom of the variable capacity hydraulic pump of the HST 40 from the final vehicle speed command value V by searching the map 76 stored in the ROM.

Next, in a step S9, the controller 70 calculates the swash plate angle command value Mcom of the variable capacity hydraulic motor of the HST 40 from the final vehicle speed command value V by searching the map 77 stored in the ROM.

In a step S10, the controller 70 outputs the swash plate angle command value Pcom of the variable capacity hydraulic pump to the HST 40.

In a step S11, the controller 70 outputs the swash plate angle command value Mcom of the variable capacity hydraulic motor to the HST 40. Following the processing of the step S11, the controller 70 terminates the routine.

It should be noted that the steps S6 and S8-S11 correspond to first speed ratio modifying means, and the steps S7 and S8-S11 correspond to second speed ratio modifying means.

By executing the routine described above, the throttle opening of the internal combustion engine 30 is increased via the throttle wire 5 when the operator depresses the accelerator pedal 1, thereby increasing the output of the internal combustion engine 30. Meanwhile, the controller 70 determines the vehicle speed command basic value Vo by selecting the smaller of the target vehicle speed Vne according to the engine rotation speed Ne and the target vehicle speed Vu according to the depression angle U of the accelerator pedal 1. The controller 70 then calculates the final vehicle speed command value V by multiplying the inching coefficient ki, which is based on the depression angle i of the inching pedal 27, by the vehicle speed command basic value Vo, calculates the swash plate angle command value Pcom of the variable capacity hydraulic pump and the swash plate angle command value Mcom of the variable capacity hydraulic motor from the final vehicle speed command value V by searching the maps 76 and 77, and outputs the results to the HST 40.

This control exhibits a favorable effect when the tractor is operated while a load is applied thereto, for example when traveling uphill, performing towing work, and so on. In these cases, the engine rotation speed succumbs to the load and cannot easily increase. Accordingly, the operator depresses the accelerator pedal 1 further.

During conventional control performed in relation to this operation, an attempt is made to increase the throttle opening and shift the speed ratio of the HST 40 to a high speed side. In other words, the speed ratio of the HST 40 is shifted to the high speed side before the engine rotation speed has increased, and therefore the operation of the internal combustion engine 30 becomes increasingly labored.

In the speed ratio control device according to this invention, on the other hand, when the rotation speed Ne of the internal combustion engine 30 remains low even when the accelerator pedal 1 is depressed, the determination of the step S5 becomes affirmative, and therefore the target vehicle speed Vne based on the rotation speed Ne of the internal combustion engine 30 is employed as the vehicle speed command basic value Vo. Hence, the vehicle speed command basic value Vo is maintained at a small value, and as a result, the final vehicle speed command value V is also small.

As shown in the map 76 in FIG. 2, when the final vehicle speed command value V is small, the swash plate angle command value Pcom of the variable capacity hydraulic pump also takes a small value. Further, as shown in the map 77 in FIG. 2, when the final vehicle speed command value V is small, the swash plate angle command value Mcom of the variable capacity hydraulic motor takes a large value. In other words, the capacity of the variable capacity hydraulic pump is small and the capacity of the variable capacity hydraulic motor is large. This state corresponds to a large speed ratio. As a result, the vehicle speed does not increase even when the throttle opening increases. Hence, even when a load is applied, the rotation speed of the internal combustion engine 30 can be increased quickly.

The speed ratio control device according to this invention also exhibits a favorable effect when applied to work employing a power take-off shaft for driving a mower or a rotary working machine directly using an internal combustion engine output, i.e. unique uses of a tractor.

When driving a mower, the engine rotation speed of the internal combustion engine 30 is normally constant. The accelerator lever 28 provided in the tractor is normally held fixedly in an operating position that was set most recently, by friction or the like.

When driving a mower, the operator must control the traveling speed of the tractor while maintaining a fixed high engine rotation speed.

In a conventional automotive speed ratio control device in which the traveling speed of the tractor is controlled in accordance with the engine rotation speed alone, in such cases the operator must adjust the traveling speed of the tractor by controlling the depression amount of the inching pedal 27.

A mower is often used continuously for a long period of time, and therefore the inching pedal 27 must be operated for a long period of time, which places a heavy burden on the operator.

However, when mowing work is performed with the speed ratio control device according to this invention, speed ratio control based on the target vehicle speed Vu according to the accelerator pedal depression amount U can be performed by having the operator operate the accelerator lever 28 such that the engine 30 is maintained at a high rotation speed via the throttle wire 29 while keeping the depression amount of the accelerator pedal 1 small. As a result, the operation frequency of the inching pedal 27 during the work can be reduced dramatically.

Further, when the operator takes his/her foot off the accelerator pedal 1 to decelerate and stop the tractor using an engine brake, the rotation speed of the engine 30 increases temporarily due to a rotary force from the vehicle wheels, which is generated due to vehicle inertia. In this case also, the target vehicle speed Vu based on the accelerator pedal depression amount U is smaller than the target vehicle speed Vne based on the engine rotation speed Ne, and therefore speed ratio control based on the target vehicle speed Vu according to the accelerator pedal depression amount U is performed. Hence, the tractor is decelerated smoothly without a delay in the return to a neutral position of the HST 40 due to the effects of a temporary increase in the engine rotation speed Ne.

Moreover, in the speed ratio control device according to this invention, the vehicle speed command value V is obtained by correcting the vehicle speed command basic value Vo using the inching coefficient ki corresponding to the depression angle i of the inching pedal 27. As shown in the map 73 in FIG. 2, the inching coefficient ki reaches zero when the depression angle i of the inching pedal 27 increases, and as a result, the vehicle speed command value V also reaches zero. Hence, in this case, the speed ratio reaches infinity. When the inching pedal 27 is depressed beyond a fixed level, on the other hand, the brake device performs vehicle braking in conjunction therewith. Hence, when the inching pedal 27 is depressed by the operator with the aim of decelerating or stopping the tractor, the tractor decelerates quickly.

The contents of Tokugan 2007-059704, with a filing date of Mar. 9, 2007 in Japan, are incorporated herein by reference.

Although the invention has been described above with reference to certain embodiments, the invention is not limited to the embodiments described above. Modifications and variations of the embodiments described above will occur to those skilled in the art, within the scope of the claims.

For example, instead of the accelerator pedal 1 operated by foot, an accelerator lever that is operated by the hand of the operator may be provided separately to the accelerator lever 28.

In the above embodiment, the parameters required for control are detected using sensors, but this invention can be applied to any device which can perform the claimed control using the claimed parameters regardless of how the parameters are acquired.

INDUSTRIAL APPLICABILITY

As described above, with this invention, a vehicle can be driven at a vehicle speed according to a depression amount of an accelerator pedal even when an internal combustion engine is rotated at high speed to supply working power. Accordingly, this invention exhibits a particularly favorable effect when applied to a working vehicle that generates traveling power and working power using a single internal combustion engine.

The invention claimed is:

1. A speed ratio control device for a working vehicle that uses an output of an internal combustion engine as a working power and a traveling power, and comprises an accelerator pedal that increases a rotation speed of the internal combustion engine when depressed and a transmission that shifts a rotation of the internal combustion engine and applies the shifted rotation to the traveling power, comprising:
 a programmable controller programmed to:
  calculate a first target vehicle speed according to the rotation speed of the internal combustion engine;
  calculate a second target vehicle speed according to a depression amount of the accelerator pedal;
  vary the speed ratio of the transmission to achieve the first target vehicle speed when the first target vehicle speed is lower than the second target vehicle speed; and
  vary the speed ratio of the transmission to achieve the second target vehicle speed when the first target vehicle speed is not lower than the second target vehicle speed.

2. The speed ratio control device for a working vehicle as defined in claim 1, further comprising:
 a sensor that detects the rotation speed of the internal combustion engine; and a sensor that detects the depression amount of the accelerator pedal.

3. The speed ratio control device for a working vehicle as defined in claim 1, wherein the transmission is constituted by a hydrostatic transmission combining a variable capacity hydraulic pump and a variable capacity hydraulic motor.

4. A speed ratio control device for a working vehicle that uses an output of an internal combustion engine as a working power and a traveling power, and comprises an accelerator pedal that increases a rotation speed of the internal combustion engine when depressed, a transmission constituted by a hydrostatic transmission combining a variable capacity hydraulic pump and a variable capacity hydraulic motor to shift a rotation of the internal combustion engine and applies the shifted rotation to the traveling power, and an inching pedal that applies braking to the working vehicle when depressed beyond a fixed amount, the device comprising:

a programmable controller programmed to:
calculate a first target vehicle speed according to the rotation speed of the internal combustion engine;
calculate a second target vehicle speed according to a depression amount of the accelerator pedal;
vary the speed ratio of the transmission to achieve the first target vehicle speed when the first target vehicle speed is lower than the second target vehicle speed; and
vary the speed ratio of the transmission to achieve the second target vehicle speed when the first target vehicle speed is not lower than the second target vehicle speed;

wherein the controller is further programmed to:
set the smaller of the first target vehicle speed and the second target vehicle speed as a vehicle speed command basic value;
calculate a final vehicle speed command value by reducing the vehicle speed command basic value in accordance with a depression amount of the inching pedal; and
vary the speed ratio of the transmission such that the final vehicle speed command value is realized.

5. The speed ratio control device for a working vehicle as defined in claim 4, wherein the controller is further programmed to set the final vehicle speed command value at zero when the depression amount of the inching pedal exceeds a predetermined amount.

6. The speed ratio control device for a working vehicle as defined in claim 3, wherein the controller is further programmed to maintain the speed ratio at infinity by setting a capacity of the hydraulic pump at zero when the final vehicle speed command value is zero.

7. The speed ratio control device for a working vehicle as defined in claim 1, wherein the internal combustion engine comprises a mechanical throttle which is connected to the accelerator pedal via a mechanical link and varies a throttle opening in accordance with the depression amount of the accelerator pedal.

8. The speed ratio control device for a working vehicle as defined in claim 1, wherein the working vehicle further comprises an accelerator lever that increases the rotation speed of the internal combustion engine when operated.

9. A speed ratio control method for a working vehicle that uses an output of an internal combustion engine as a working power and a traveling power, and comprises an accelerator pedal that increases a rotation speed of the internal combustion engine when operated and a transmission that shifts a rotation of the internal combustion engine and applies the shifted rotation to the traveling power, comprising:

using a calculating and modifying device to calculate a first target vehicle speed according to the rotation speed of the internal combustion engine;
using the calculating and modifying device to calculate a second target vehicle speed according to a depression amount of the accelerator pedal;
varying a speed ratio of the transmission to achieve the first target vehicle speed when the first target vehicle speed is lower than the second target vehicle speed; and
varying the speed ratio of the transmission to achieve the second target vehicle speed when the first target vehicle speed is not lower than the second target vehicle speed.

* * * * *